United States Patent [19]
Eichhorn

[11] Patent Number: 5,669,951
[45] Date of Patent: Sep. 23, 1997

[54] METHOD FOR FORMING A GROOVED, COATED DECORATIVE GLASS SHEET

[75] Inventor: Keith L. Eichhorn, High Point, N.C.

[73] Assignee: Glass Unlimited of High Point, Inc., High Point, N.C.

[21] Appl. No.: 537,237

[22] Filed: Sep. 29, 1995

[51] Int. Cl.⁶ .............. C03C 17/00; C03C 25/02; C03C 19/00; C03B 21/00

[52] U.S. Cl. .............. 65/60.1; 65/61; 65/112; 65/114; 427/275; 427/287

[58] Field of Search .............. 65/60.1, 61, 111, 65/112, 114; 427/275, 287

[56] References Cited

U.S. PATENT DOCUMENTS

| | | | |
|---|---|---|---|
| 1,600,580 | 9/1926 | D'Arino et al. | 427/275 |
| 1,790,531 | 1/1931 | Bethlem | 427/275 |
| 4,300,933 | 11/1981 | Thomas | 65/60.1 |
| 4,300,934 | 11/1981 | DeTorre | 65/60.1 |
| 4,416,930 | 11/1983 | Kelly | 428/137 |
| 4,488,919 | 12/1984 | Butler | 156/153 |
| 4,813,990 | 3/1989 | Thorn | 65/112 |
| 4,822,397 | 4/1989 | Crossley | 65/107 |
| 4,911,743 | 3/1990 | Bagby | 65/31 |
| 5,108,479 | 4/1992 | Hirano | 65/60.52 |
| 5,137,560 | 8/1992 | Ohmura et al. | 65/60.52 |
| 5,395,414 | 3/1995 | Matasick et al. | 65/60.1 |

*Primary Examiner*—Donald E. Czaja
*Assistant Examiner*—Jacqueline A. Ruller
*Attorney, Agent, or Firm*—Rhodes, Coats & Bennett, L.L.P.

[57] ABSTRACT

This invention teaches a method for forming a tempered, coated, grooved and/or beveled decorative glass sheet. The decorative glass sheet includes a coating on a surface thereof and a groove or bevel formed in the surface. The coating is substantially registered with at least on peripheral edge of the groove or bevel such that the coating is not disposed within the groove or bevel. The decorative glass sheet is formed by applying a coating, preferably by screen printing, to a surface of the glass panel. The coating is fired so as to set the coating into the glass panel. A groove and/or bevel is formed in the coated surface. The glass panel is then tempered. Preferably, the step of firing the coating is followed by the step of cooling the glass panel at a rate sufficient to temper the glass panel and, more preferably, at a rate sufficient to induce heat strengthening.

25 Claims, 3 Drawing Sheets

METHOD FOR FORMING A GROOVED, COATED DECORATIVE GLASS SHEET

FIELD OF THE INVENTION

The present invention is directed to a decorative glass sheet of the type used for architectural applications and a method for forming the same, and, more particularly, a coated, grooved and/or beveled glass decorative sheet suitable for use in architectural applications and a method for forming the same.

BACKGROUND OF THE INVENTION

In recent years, the interior and exterior design of buildings and structures, as well as the furnishings therefor, have employed increasing quantities of decorative glass. For example, it is now commonplace for glass sheets to be used in various types of doors such as shower doors, storm doors, patio doors, entry doors, bi-fold doors, and in decorative windows, mirrors, and other furniture and architectural applications. As the scope of architectural and design tastes expands, the industry has become increasingly receptive to glass sheet products which have unique visual effects.

One such visual effect is achieved by the use of a ground groove in the surface of such glass products. The groove is formed by grinding into the surface of an annealed glass sheeting. Another desirable effect is achieved by treating the glass sheet with a translucent or opaque etching, frosting, or coating. Moreover, it is often desirable to provide both the aforementioned grooves and a translucent or opaque etching, frosting or coating.

For most architectural glass applications, Federal law requires that the glass sheets meet certain safety regulations regarding strength and break resistance. Where a mirror backing is used, it is commonplace to provide a vinyl coating to the back of the glass sheet which reinforces the sheet and reduces shattering. However, where a mirror backing is not desired, the vinyl backing cannot be implemented as it would interfere with the translucent or transparent aspect of the glass. In such case, it is generally necessary to temper the glass sheet thereby increasing its break resistance to comply with Federal regulations.

Once a glass sheet has been tempered, it is no longer feasible to grind or abrade grooves and/or bevels therein. The tempering process creates a cross-sectional stress profile in the glass sheet which, when a grooving tool is applied to the sheet, tends to cause the sheet to shatter. Therefore, it is necessary to groove and bevel the sheet in the annealed state when the stress profile is more conducive to such operations.

As noted above, it is often desirable to provide a decorative glass sheet having both grooves and/or bevels and an opaque and/or translucent etching, frosting or coating.

It is known to frost or etch a glass panel by sandblasting or acid application and to further groove or bevel the glass sheet before or after the frosting or etching operation. Etched or frosted surfaces of a glass sheet tend to become tarnished and stained in use by the collection of oils (e.g., from hands), dirt, and microorganisms. Further, colors cannot be provided to the sheet using etching or frosting.

It is also known to groove or bevel a glass sheet while in the annealed state then temper the sheet, and thereafter apply a color coating. To avoid introducing the coating into the groove or bevel where it is not desired, it is necessary to adapt the coating process to apply coating only about the periphery of the groove or bevel. In practice, it is very difficult to accurately register the edge of the coating with the edge of a groove or bevel and an unsightly uncoated border usually remains between the respective edges and/or, even more unsightly, a portion of the coating lies within the groove or bevel.

It is also known to apply an air dried enamel to a glass sheet and thereafter groove or bevel the sheet. The air dried enamel is not permanently adhered to the glass surface and tends to separate and flake therefrom. Further, a higher rejection rate is realized because the sheet must be immersed in water to groove or bevel. Because the resulting glass panel has a non-permanent cold coating, it is only useful for indoor, non-architectural, decorative uses.

Thus, there exists a need for a method for forming decorative glass panels having both a coating thereon and grooves or bevels formed therein. It is highly desirable that such method provide glass panels wherein the edges of the coating adjacent the grooves or bevels are accurately registered with the peripheral edges of the grooves or bevels. There exists a need for such a method which provides a decorative glass panel which is tempered and suitable for indoor and outdoor architectural applications. Moreover, the coating on the decorative glass sheet should be resistant to separation from the surface of the glass sheet and to stains and tarnishing from pollutants in the environment.

SUMMARY OF THE INVENTION

The present invention is directed to a decorative glass sheet including a tempered glass panel having a coating disposed on a surface thereof. At least one of a groove and a bevel is formed in the surface. The groove or bevel has at least one peripheral edge. The coating is substantially exactly registered with the at least one peripheral edge such that the coating is not disposed within the groove or bevel.

The glass panel may include a side edge and an uncoated border adjacent the side edge. The glass panel may be frosted.

The present invention is further directed to a method for forming coated, grooved decorative glass sheets which are suitable for architectural applications and which provide accurate registry between the edges of the coating and the peripheral edges of the grooves or bevels. More particularly, the method of the present invention is directed to forming a tempered, decorative, grooved and/or beveled, coated glass sheet from an annealed glass panel. A coating is applied to a surface of the glass panel, preferably by screen printing. Thereafter, the coating is fired so as to set the coating into the glass panel. A groove and/or a bevel is formed in the coated surface. Thereafter, the coated and grooved and/or beveled glass panel is tempered.

Preferably, the step of firing the coating is followed by the step of cooling the glass panel at a rate insufficient to temper the glass panel. More preferably, the step of firing the coating is followed by the step of cooling the glass panel at a rate sufficient to induce heat strengthening in the glass panel but insufficient to temper the glass panel.

The coating may be pre-cured prior to the step of firing the coating.

Preferably, the glass panel is edged prior to applying the coating.

The step of applying the coating may include applying the coating such that a border of uncoated glass panel surface is provided adjacent an edge of the glass panel. The border so formed facilitates handling and implementation of the glass sheet.

The method according to the present invention may include a further step of frosting the surface of the glass panel prior to the step of applying the coating.

It is a primary object of the present invention to provide a coated and grooved and/or beveled decorative glass sheet for architectural applications.

An object of the present invention is to provide such a decorative glass sheet which is well suited for interior and exterior architectural applications and which may be formed so as to comply with Federal regulations regarding such applications.

A further object of the present invention is to provide a decorative glass panel as described above wherein the edges of the coating adjacent the grooves and/or bevels are accurately registered with the peripheral edges of the grooves and/or bevels.

Yet another object of the present invention is to provide a method for forming a decorative glass sheet as described above which may be conveniently and cost effectively practiced, and, moreover, which may be practiced using conventionally available equipment.

BRIEF DESCRIPTION OF THE DRAWINGS

Other objects and a fuller understanding of the invention will become apparent upon reading the detailed description of a preferred embodiment which follows, along with the accompanying drawings in which.

DETAILED DESCRIPTION OF THE PREFERRED EMBODIMENT

The present invention is drawn to tempered, decorative glass panels having grooves and/or bevels and decorative coatings and a method for forming the same. With reference to the figures, a conventional glass panel 400 is formed into a decorative glass sheet 100 by means of equipment 300 which implements the process as set forth in FIG. 1.

Figure 2:
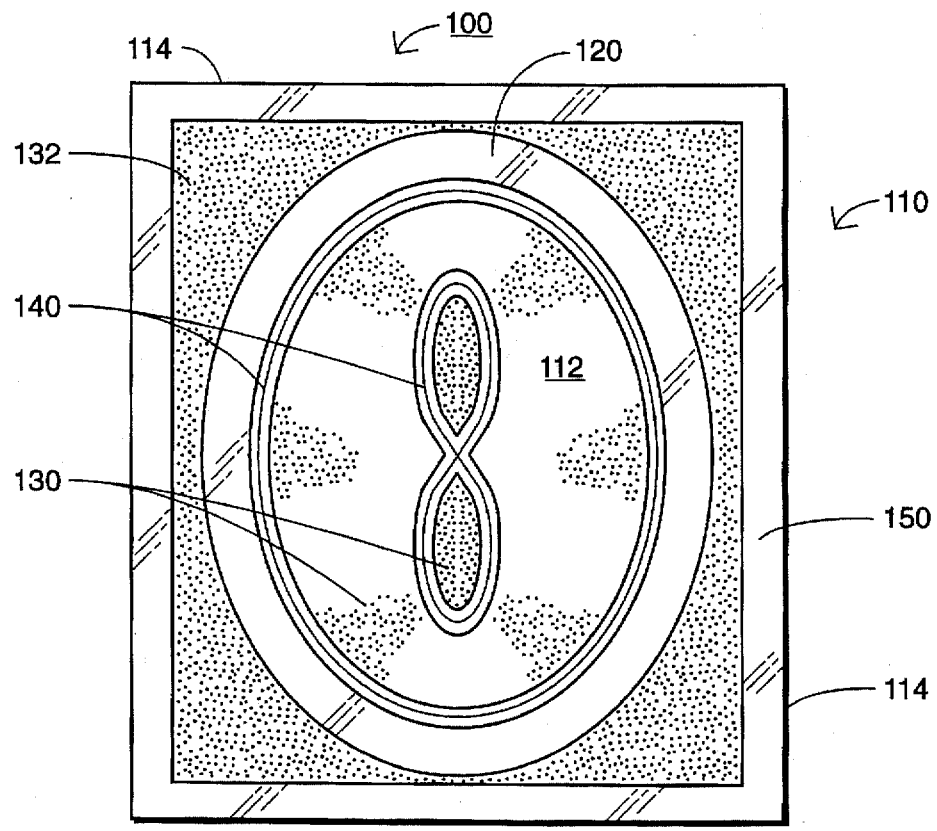
FIG. 2 is a front plan view of a decorative glass panel as formed according to the method of the present invention.

With reference to FIG. 2, decorative glass sheet 100 is exemplary of products formed by the process of the present invention. Decorative glass sheet 100 includes glass panel 110 having a front surface 112 and edges 114, generally. Grooves 140 are formed in surface 112. Coatings 130, 132 are disposed on from surface 112 and define uncoated areas 120 and uncoated border 150. It will be appreciated from the discussion which follows that decorative glass sheets according to the present invention may be formed with any combination and designs of bevels, grooves, and colored or uncolored coatings.

Figure 3:
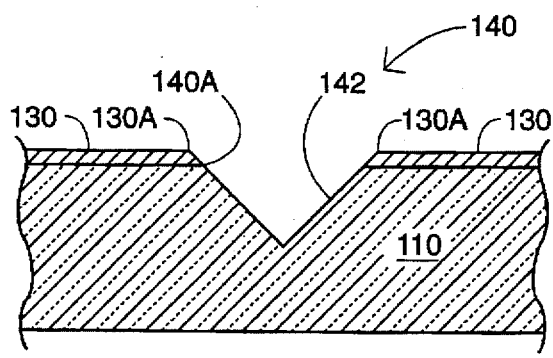
FIG. 3 is a cross-sectional side view of a decorative glass panel formed according to the method of the present invention with a groove formed therein.

With reference to FIG. 3, each groove 140 includes side walls 142, each having peripheral edges 140A. Coating regions 130 include peripheral edges 130A which are substantially exactly registered or aligned with respective peripheral edges 140A.

Border 150 may be provided to aid in handling decorative glass sheet 100. Further, border 150, being clean of coating, provides a more suitable surface for interfacing with insulation material when the decorative glass sheet 100 is used in a bi-panel configuration.

Figure 4:
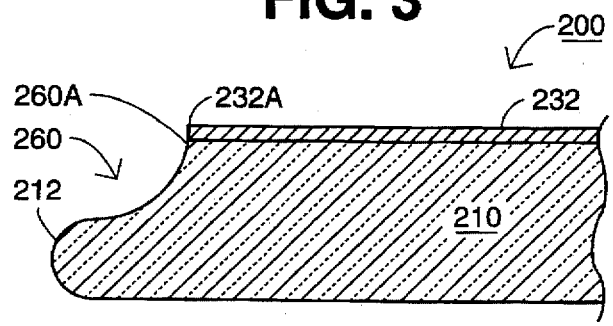
FIG. 4 is a cross-sectional side view of a decorative glass panel formed according to the method of the present invention and wherein the edge is rounded and includes a bevel formed therein.

With reference to FIG. 4, an edge of a second decorative glass sheet 200 according to the present invention is shown therein. Decorative glass sheet 200 includes glass panel 210 having a bevel 260 formed in an edge thereof. Further, the edge has been edged or rounded (as discussed below with regard to Step 2). Bevel 260 has peripheral edge 260A. A coating 232 is disposed on the front surface of glass panel 210 and has peripheral edge 232A which is substantially exactly registered with peripheral edge 260A.

Figure 1:
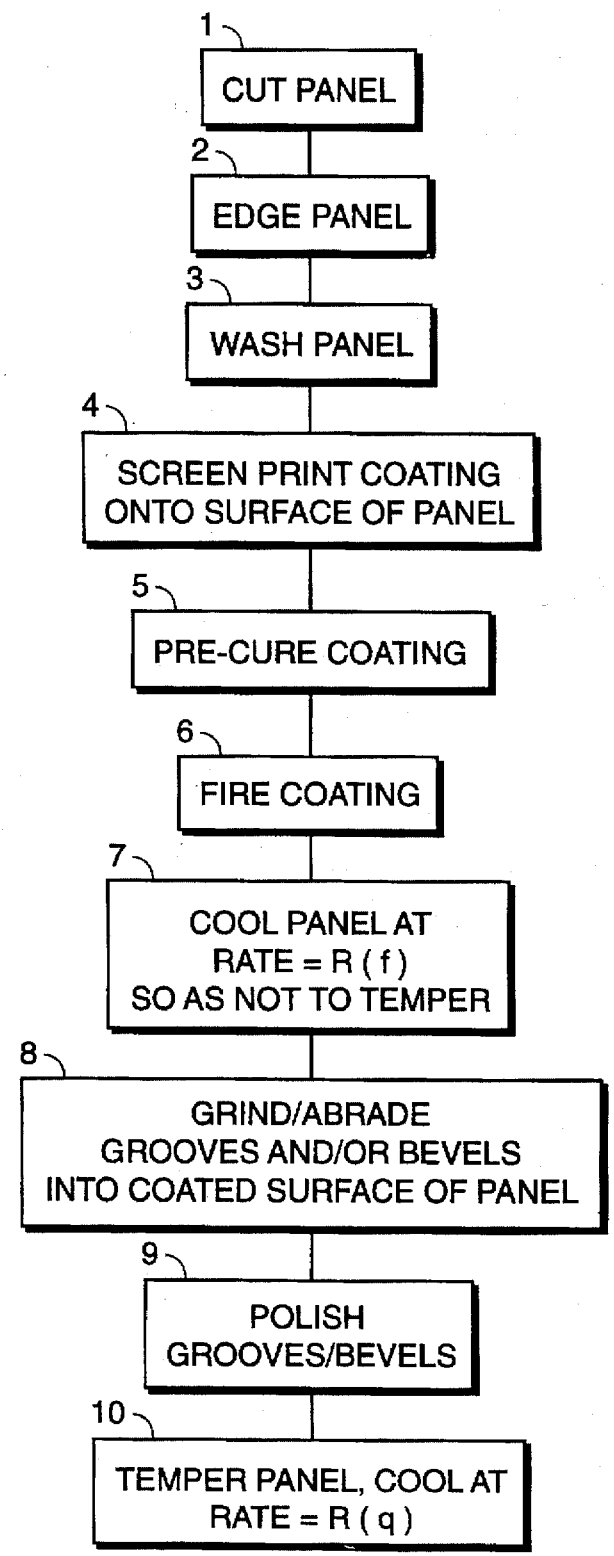
FIG. 1 is a schematic flow chart representing the steps of a method according to the present invention for forming decorative glass panels.
Figure 5:
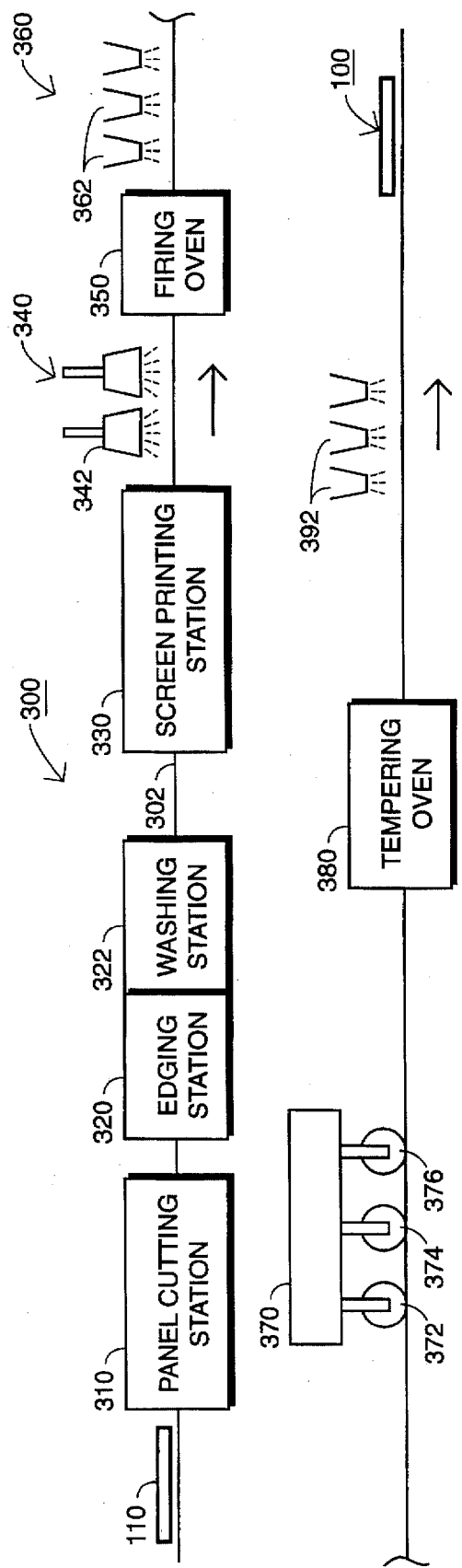
FIG. 5 is a schematic view of apparatus suitable for practicing the method of the present invention.

With particular reference to FIG. 1, decorative glass sheets 100, 200 or the like may be formed according to the process set forth therein. While apparatus as shown in FIG. 5 and described hereinbelow may be utilized to practice the process of FIG. 1, it will be appreciated that any suitable apparatus or combination of equipment may be used. Further, it will be appreciated that the relevant parameters (e.g., firing temperature, cooling rate, etc.) will vary depending on the materials used and the effect desired. The selection of such parameters is within the purview of those of ordinary skill in the art having knowledge of the disclosure herein. While the discussions below reference glass panel 100, it will be appreciated that beveled glass panels 200 may be formed by the same or a similar process and apparatus.

A glass panel 110 is typically provided in a larger size than is appropriate for the ultimate decorative glass sheet 100. In such case, Step 1 is executed wherein the panel is cut to form a smaller panel. The means and method for cutting the panel are conventionally known. It will be appreciated that, if the panel is already of an appropriate size, Step 1 will not be necessary.

In Step 2, the panel is edged in order to round and smooth edges 114. The edging step is primarily for preparing the panel for the tempering step rather than for decorative effect. If the edges are not rounded and smoothed, there is a tendency for stresses in the glass panel to focus at the sharp points or edges left in formation or by the cutting step and hence an increased tendency for the panel to shatter during or after the tempering process.

In Step 3, the panel is washed to remove glass fragments and powder left from Steps 1 and 2.

In Step 4, the coatings are applied to the front surface of the panel, preferably by screen printing. The coating may be any suitable glass surface coating and is preferably a ceramic based ink. Suitable ceramic based inks include ceramic pigment/frit in a pine oil carrier available from Cerdec of Pittsburgh, Pa.

In Step 5, the coating is pre-cured in order to set the ink to a dry powder state. Further, the pre-curing step serves to dry any excess carrier in the ink which could "misfire" or ignite during the firing step.

In Step 6, the coating on the front surface of the glass panel is fired, thereby causing the coating to permanently bond to the surface of the glass panel. The preferred duration and temperature will depend on the thickness of the glass panel and the nature of the coating.

In Step 7, following the firing step, the glass panel with the fired coating thereon is allowed to cool at a rate of R(f). The value of R(f) is chosen so as to be less than the rate of cooling necessary to temper the glass panel. As a result, the annealed state of the glass panel is preserved. However, R(f) may be chosen such that a prescribed degree of heat strengthening is induced in the glass panel. The preferred rate of cooling will depend upon the thickness of the glass panel.

In Step 8, the grooves and/or bevels are formed in the front, coated surface of the glass panel by grinding, abrading, or any other suitable technique for forming grooves and/or bevels in annealed or heat strengthened glass.

Thereafter, in Step 9, the grooves and/or bevels are polished by any suitable means.

It will be appreciated that following Step 9, the glass panel is grooved, annealed, and coated, the coating being fired and thereby bonded to the front surface of the glass panel. In Step 10, the glass panel is tempered in conventional fashion by heating the same to a prescribed temperature and allowing the glass panel to cool at a rate of R(q). The temperature and R(q) may be the same as used to temper a glass panel of similar size and thickness, however, the temperature and rate of cooling may be adjusted to selectively alter or arrive at different colors of coatings.

With reference to FIG. 5, equipment 300 suitable for forming decorative glass sheets 100, 200 or the like according to the present invention is shown therein. Equipment 300 includes a plurality of work stations through which glass panel 110 is conveyed by conveyor 302. It will be appreciated that rather than conveying the glass panel between stations, the glass panel may be otherwise carried or transported from station to station.

Panel cutting station 310 is utilized to accomplish Step 1. Panel cutting station 310 may be any suitable means or apparatus for cutting the glass panel, including, for example, a hand cutting tool or a common splitter table.

Edging station 320, for executing Step 2, and washing station 322, for executing Step 3, are preferably provided as a single unit so that the washing step is accomplished immediately after the edging step. Edging station 320 may include driven diamond wheels adapted to round edges 114. The diamond wheels may be arranged and adapted to execute a two-step process, a rougher wheel being used first, followed by a finer grade wheel. Washing station 322 may include water jets (not shown) which serve to remove and transport glass fragments and powder away from the glass panel. Suitable washing and edging stations are available from Besana Lovatti of Italy.

After the panel has been washed, it is conveyed or otherwise transported to screen printing station 330. Screen printing station 330 may be automatic, manual, or semi-automatic. Preferably, screen printing station 330 will utilize a fine mesh screen (not shown). Preferably, the screen will have a mesh size in the range of 158 to 280 mesh, depending on the size and detail of the image to be printed. Suitable screen printing stations are available from Svecia of Sweden. The coating or coatings may be applied to the glass panel by other suitable means, for example, by curtain coating.

The glass panel with the coating on the front (upper) surface thereof is exposed to precuring station 340 which includes heat lamps 342. Heat lamps 342 serve to evaporate volatile carriers in the coating. Preferably, heat lamps 342 will create temperatures in the glass in the range of 200° to 300° F. and the glass will be exposed to the lamps 342 for from about five minutes to about six minutes.

Next, the glass panel with the coating or coatings thereon is introduced to firing oven 350. Firing oven 350 may be a conventional tempering oven such as a tempering line available from Hordis of Cinnaminson, N.J. Firing oven 350 heats the glass panel to a temperature sufficient to "fire" the coating thereby bonding it to the glass surface. The firing temperature will typically be in the range of about 1,100° F. to about 1,300° F.

After the glass panel leaves firing oven 350, it is passed through cooling station 360 which includes air nozzles 362. The flow rate and temperature of air from air nozzles 362 is chosen to cool the glass panel at R(f). Alternatively, the glass panel may be exposed to ambient, unforced air for a prescribed period.

A lehr may be used in place of firing oven 350 and cooling station 360.

After the glass panel with the coating thereon has been cooled to a sufficient temperature, typically less than 200° F., the glass panel is introduced to grinding/beveling station 370. At grinding/beveling station 370, the glass panel is preferably subjected to grinding wheels 372, 364 and polishing wheel 376. Grooving/beveling station 370 may be any suitable grinding or beveling apparatus.

Once the desired groove or bevel pattern has been formed in the glass panel, the grooved and/or bevelled and coated glass panel is passed through tempering oven 380. In tempering oven 380, the glass panel is subjected to appropriate temperatures for a time sufficient to temper the glass panel upon appropriate quenching. After the glass panel leaves tempering oven 380, it is passed through quenching station 390 which includes air nozzles 392. Any suitable means may be used to quench the glass panel, including the addition of moisture to the air expressed from the nozzles. The flow rate and temperature of air from nozzles 392 is chosen so as to cool the glass panel at R(q) and thereby quench the glass panel. The resulting decorative glass sheet product 100 may thereafter be removed from equipment 300 for further processing.

Figure 6:
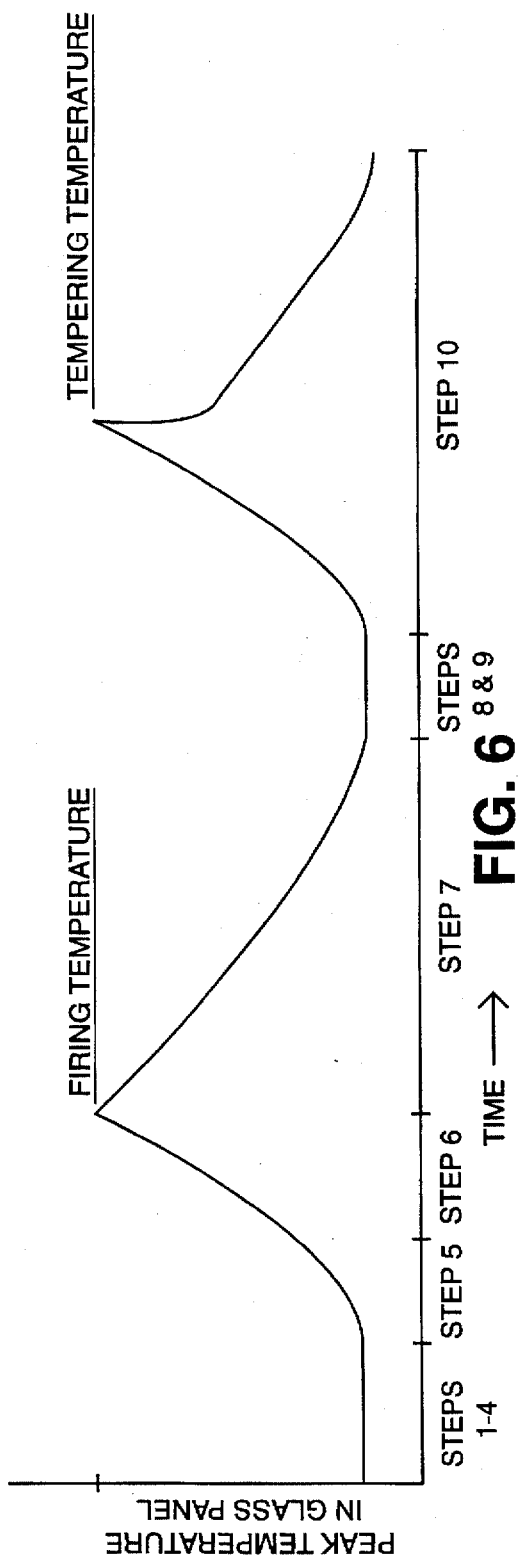
FIG. 6 is a graph representing the peak temperature in the glass panel over time during the practice of the method according to the present invention.

FIG. 6 represents the peak temperature in the glass panel over time as the glass panel is processed through equipment 300. It will be noted that the glass panel remains in an annealed or heat strengthened state throughout the process until it is finally tempered at the end of the process.

Preferably, the firing step is executed at a temperature and for a period insufficient to completely "true" the coating to the desired color. When the coating is again heated during the tempering step, the coating is fully "trued" to the ultimate and selected color.

It will be appreciated that various combinations of tempering temperatures and quenching rates may be used, and, moreover, that such parameters will be dependent on the dimensions of the glass panel. Likewise, various combinations of firing temperatures and post-firing cooling rates may be used, depending on the coating and the dimensions of the glass panel.

It will be appreciated that the method as described above may be used with any coating and/or printing method which requires that the coating be fired. For example, the coating may be introduced to the glass surface in the form of decals.

EXAMPLE

An example of the method according to the present invention and practiced in accordance with the above description follows.

A glass sheet having a thickness in the range of 3.3 mm to 5.0 mm was cut, edged, and washed as described above such that the resultant panel had swiped edges (i.e., sharp edges were uniformly sanded away). In the coating step, a layer of ceramic pigment/frit in a pine oil based carrier was screen printed onto the upper surface of the panel to a thickness of 1.0 to 2.0 mils. The coating was pre-cured for 4.5 to 5.5 minutes at 200° to 300° F. The coating was fired at 1100°–1300° F. for approximately 2 minutes. The panel was cooled by exposure to ambient air (approximately 80°–90° F.) for approximately 2 minutes. The desired groove/bevel pattern was formed in the panel using conventional grinding wheels. The glass panel was then tempered for two to three minutes at 1,100° to 1,300° F. The glass panel with coating and grooves/bevels was cooled initially at a quenching rate (i.e., at a rate sufficient to temper the glass panel) and thereafter at a lesser rate until the panel was cool enough to handle.

Glass sheets formed according to the preceding example are high in strength and visually appealing. Moreover, the breakage rates obtained by this process are relatively low.

While a preferred embodiment of the invention has been described in detail hereinabove, it is apparent that various changes and modifications might be made without departing from the scope of the present invention which is set forth in the accompanying claims. For example, multiple colors may be used on a single glass panel. All such alterations and modification are intended to fall within the scope of the claims which follow.

What is claimed is:

1. A method for forming a tempered, coated, grooved and/or beveled decorative glass sheet from an annealed glass panel, comprising the steps of:
   a) applying a coating to a surface of the glass panel;
   b) firing the coating so as to set the coating into the glass panel;
   c) after said step of firing, forming at least one of a groove and a bevel in the glass panel through the coating; and
   d) tempering the glass panel.

2. The method of claim 1 wherein the step of firing the coating is followed by the step of cooling the glass panel at a rate insufficient to temper the glass panel.

3. The method of claim 1 wherein the step of firing the coating is followed by the step of cooling the glass panel at a rate sufficient to induce heat strengthening in the glass panel but insufficient to temper the glass panel.

4. The method of claim 1 further including the step of pre-curing the coating prior to the step of firing the coating.

5. The method of claim 1 wherein the step of applying the coating includes screen printing the coating onto the glass panel.

6. The method of claim 1 further including the step of rounding and smoothing edges of the glass panel prior to applying the coating.

7. The method of claim 1 wherein said step of applying the coating includes applying the coating such that a border of uncoated glass panel surface is provided adjacent an edge of the glass panel.

8. The method of claim 1 further including the step of frosting the surface of the glass panel prior to said step of applying the coating.

9. A method for forming a tempered, coated, grooved and/or beveled decorative glass sheet from an annealed glass panel, comprising the steps of:
   a) applying a coating to a surface of the glass panel;
   b) pre-curing the coating;
   c) firing the coating so as to set the coating into the glass panel;
   d) cooling the glass panel at a rate insufficient to temper the glass panel;
   e) after said step of firing, forming at least one of a groove and a bevel in the glass panel through the coating; and
   f) tempering the glass panel.

10. The method of claim 9 wherein the step of cooling the glass panel includes cooling the glass panel at a rate sufficient to induce heat strengthening in the glass panel but insufficient to temper the glass panel.

11. The product of claim 9 wherein the step of applying the coating includes screen printing the coating onto the glass panel.

12. The method of claim 9 further including the step of rounding and smoothing edges of the glass panel prior to screen printing the coating.

13. The method of claim 9 wherein said step of applying the coating includes applying the coating such that a border of uncoated glass panel surface is provided adjacent an edge of the glass panel.

14. The method of claim 9 further including the step of frosting the surface of the glass panel prior to said step of applying the coating.

15. A method for forming a tempered, coated, grooved and/or beveled decorative glass sheet from an annealed glass panel, comprising the steps of:
   a) applying a coating to a surface of an annealed glass panel;
   b) firing the coating so as to set the coating into the glass panel;
   c) cooling the glass panel at a rate insufficient to temper the glass panel;
   c) after said step of firing, forming at least one of a groove and a bevel in the glass panel through the coating; and
   d) tempering the glass panel.

16. The method of claim 15 wherein the step of cooling the glass panel includes cooling the glass panel at a rate sufficient to induce heat strengthening in the glass panel but insufficient to temper the glass panel.

17. The method of claim 15 further including the step of pre-curing the coating prior to the step of firing the coating.

18. The method of claim 15 wherein the step of applying the coating includes screen printing the coating onto the glass panel.

19. The method of claim 15 further including the step of rounding and smoothing edges of the glass panel prior to applying the coating.

20. The method of claim 15 wherein said step of applying the coating includes applying the coating such that a border of uncoated glass panel surface is provided adjacent an edge of the glass panel.

21. The method of claim 15 further including the step of frosting the surface of the glass panel prior to said step of applying the coating.

22. A method for forming a tempered, coated, grooved and/or beveled decorative glass sheet from an annealed glass panel, comprising the steps of:
   a) rounding and smoothing edges of the glass panel;

b) screen printing a coating onto a surface of the glass panel;

c) pre-curing the coating;

d) firing the coating so as to set the coating into the glass panel;

e) cooling the glass panel at a rate insufficient to temper the glass panel;

f) after said step of firing, forming at least one of a groove and a bevel in the glass panel through the coating; and g) tempering the glass panel.

23. The method of claim 22 wherein the step of cooling the glass panel includes cooling the glass panel at a rate sufficient to induce heat strengthening in the glass panel but insufficient to temper the glass panel.

24. The method of claim 22 wherein said step of applying the coating includes applying the coating such that a border of uncoated glass panel surface is provided adjacent an edge of the glass panel.

25. The method of claim 22 further including the step of frosting the surface of the glass panel prior to said step of applying the coating.

* * * * *